United States Patent
Ryon et al.

(10) Patent No.: US 12,416,407 B2
(45) Date of Patent: Sep. 16, 2025

(54) COMBUSTOR ASSEMBLY INCLUDING A FUEL INJECTION SYSTEM FOR A TURBOMACHINE

(71) Applicant: Collins Engine Nozzles, Inc., Des Moines, IA (US)

(72) Inventors: Jason A. Ryon, Carlisle, IA (US); Philip Buelow, West Des Moines, IA (US)

(73) Assignee: COLLINS ENGINE NOZZLES, INC., Des Moines, IA (US)

( * ) Notice: Subject to any disclaimer, the term of this patent is extended or adjusted under 35 U.S.C. 154(b) by 0 days.

(21) Appl. No.: 18/442,159

(22) Filed: Feb. 15, 2024

(65) Prior Publication Data

US 2025/0264218 A1    Aug. 21, 2025

(51) Int. Cl.
| | |
|---|---|
| *F23R 3/14* | (2006.01) |
| *F02C 7/22* | (2006.01) |
| *F23D 5/06* | (2006.01) |
| *F23R 3/28* | (2006.01) |

(52) U.S. Cl.
CPC ............... *F23R 3/14* (2013.01); *F02C 7/22* (2013.01); *F23D 5/06* (2013.01); *F23R 3/286* (2013.01); *F05D 2240/35* (2013.01)

(58) Field of Classification Search
CPC .... F23R 3/12; F23R 3/14; F23R 3/286; F23R 3/50; F23D 5/00; F23D 5/06
See application file for complete search history.

(56) References Cited

U.S. PATENT DOCUMENTS

| | | | |
|---|---|---|---|
| 4,373,325 A | * | 2/1983 | Shekleton ................ F23R 3/02 60/737 |
| 10,208,956 B2 | | 2/2019 | Prociw et al. |
| 11,846,421 B2 | | 12/2023 | Binek et al. |
| 2005/0097889 A1 | | 5/2005 | Pilatis et al. |
| 2006/0248898 A1 | | 11/2006 | Buelow et al. |
| 2009/0100837 A1 | | 4/2009 | Von Der Bank |

(Continued)

FOREIGN PATENT DOCUMENTS

CN    114234233 B    4/2023

OTHER PUBLICATIONS

GB Search Report for Application No. 2502324.3, mailed Jul. 22, 2025, 5 pages.

*Primary Examiner* — Gerald L Sung
(74) *Attorney, Agent, or Firm* — CANTOR COLBURN LLP

(57) ABSTRACT

A combustor assembly for a turbomachine includes a combustor housing defining a combustion chamber. The combustor housing includes an inlet portion, an outlet portion, and an axial axis extending between the inlet portion and the outlet portion. A first annular plenum is arranged at the inlet portion. The first annular plenum includes a first inlet and a first outlet. A second annular plenum radially spaced from the first annular plenum is arranged at the inlet portion. The second annular plenum includes a second inlet, a second outlet, a vortex inducing member arranged between the second inlet and the second outlet, and a fuel outlet. The second outlet includes a pre-filming surface that forms an annular ring of fuel that enters the second annular plenum through the fuel outlet and passes from the second annular plenum into a swirling fluid passing through the first outlet and the second outlet.

18 Claims, 7 Drawing Sheets

(56) References Cited

U.S. PATENT DOCUMENTS

| | | | | |
|---|---|---|---|---|
| 2011/0067403 A1* | 3/2011 | Williams | ................ | F23R 3/286 |
| | | | | 60/742 |
| 2012/0186258 A1* | 7/2012 | Dai | ........................... | F23R 3/18 |
| | | | | 60/748 |
| 2012/0305673 A1* | 12/2012 | Matsuyama | ............ | F23R 3/286 |
| | | | | 239/533.2 |
| 2019/0170355 A1 | 6/2019 | Tentorio et al. | | |

\* cited by examiner

COMBUSTOR ASSEMBLY INCLUDING A FUEL INJECTION SYSTEM FOR A TURBOMACHINE

BACKGROUND

The subject disclosure relates to the art of turbomachines and, more particularly, to a combustor assembly including a fuel injection system for a turbomachine.

Turbomachines include a compressor, a combustor, and a turbine. The compressor compresses air which is combined with fuel in the combustor to create a mixture that is ignited to create high pressure gases. The high pressure gases expand through the turbine creating energy that may be used to power an airplane, a generator, or the like. The combustor includes multiple fuel injectors that direct an amount of fuel into compressed gases provided by the compressor. The amount of fuel and air mix in a combustion chamber of the combustor, are atomized, and then ignited.

The fuel injectors are typically arranged in a ring and inserted through a combustor housing. The injectors are annularly spaced about the combustion chamber. Given the geometry of the injectors, the fuel is injected into the compressed air at discrete locations and atomized. The spacing of the injectors creates fuel streams that enter axially into the combustion chamber. When ignited, hot spots and cold zones are generated in the combustion chamber. The cold zones are formed between injection streams. Hot and cold zones lead to less than efficient combustion, increased NOx emissions, as well as a decrease in an overall operational life of the turbine.

BRIEF DESCRIPTION

A combustor assembly for a turbomachine, in accordance with a non-limiting example, includes a combustor housing defining a combustion chamber. The combustor housing includes an inlet portion, an outlet portion, and an axial axis extending between the inlet portion and the outlet portion. A first annular plenum is arranged at the inlet portion. The first annular plenum includes a first inlet and a first outlet. A second annular plenum radially spaced from the first annular plenum is arranged at the inlet portion. The second annular plenum includes a second inlet, a second outlet, a vortex inducing member arranged between the second inlet and the second outlet, and a fuel outlet. The second outlet includes a pre-filming surface that forms an annular ring of fuel that enters the second annular plenum through the fuel outlet and passes from the second annular plenum into a swirling fluid passing through the first outlet and the second outlet.

In accordance with additional or alternative embodiments, the vortex inducing member includes a plurality of guide vanes extending between the second inlet and the second outlet.

In accordance with additional or alternative embodiments, the plurality of guide vanes are arranged in an annular array.

In accordance with additional or alternative embodiments, the fuel outlet is arranged between the plurality of guide vanes and the second outlet.

In accordance with additional or alternative embodiments, a fuel injector extends into the fuel outlet, the fuel injector including a first portion extending radially relative to the axial axis and a second portion extending from the first portion at a non-zero angle relative to axial axis.

In accordance with additional or alternative embodiments, the fuel injector includes an injector outlet at the second portion, the injector outlet guiding an amount of fuel along a pathway towards the pre-filming surface, the pathway including an axial component and a circumferential component.

In accordance with additional or alternative embodiments, the plurality of guide vanes extend at a first non-zero angle relative to the axial axis and the second portion of the fuel injector extends at a second non-zero angle relative to the axial axis, the second non-zero angle being substantially identical to the first non-zero angle.

In accordance with additional or alternative embodiments, the second annular plenum is radially inwardly offset relative to the first annular plenum.

In accordance with additional or alternative embodiments, the vortex inducing member comprises a guide ring arranged between the first annular plenum and the second annular plenum, the guide ring including a plurality of fuel guide slots that direct fuel from the fuel outlet along a pathway towards the pre-filming surface, the pathway including an axial component and a circumferential component.

In accordance with additional or alternative embodiments, a fuel injector having an injector outlet extends through the injector outlet, the injector directing fuel toward the vortex inducing member along an axis that is substantially perpendicular to the axial axis.

A turbomachine, in accordance with a non-limiting example, includes a compressor, a turbine mechanically connected to the compressor, and a combustor assembly fluidically connected to the compressor and the turbine. The combustor assembly includes a combustor housing defining a combustion chamber. The combustor housing includes an inlet portion, an outlet portion, and an axial axis extending between the inlet portion and the outlet portion. A first annular plenum is arranged at the inlet portion. The first annular plenum includes a first inlet and a first outlet. A second annular plenum, radially spaced from the first annular plenum, is arranged at the inlet portion. The second annular plenum includes a second inlet, a second outlet, a vortex inducing member arranged between the second inlet and the second outlet, and a fuel outlet. The second outlet includes a pre-filming surface that forms an annular ring of fuel that enters the second annular plenum through the fuel outlet and passes from the second annular plenum into a swirling fluid passing through the first outlet and the second outlet.

In accordance with additional or alternative embodiments, the vortex inducing member includes a plurality of guide vanes extending between the second inlet and the second outlet.

In accordance with additional or alternative embodiments, the plurality of guide vanes are arranged in an annular array.

In accordance with additional or alternative embodiments, the fuel outlet is arranged between the plurality of guide vanes and the second outlet.

In accordance with additional or alternative embodiments, a fuel injector extends into the fuel outlet, the fuel injector including a first portion extending radially relative to the axial axis and a second portion extending from the first portion at a non-zero angle relative to axial axis.

In accordance with additional or alternative embodiments, the fuel injector includes an injector outlet at the second portion, the injector outlet guiding an amount of fuel along a pathway towards the pre-filming surface, the pathway including an axial component and a circumferential component.

In accordance with additional or alternative embodiments, the plurality of guide vanes extend at a first non-zero angle relative to the axial axis and the second portion of the fuel injector extends at a second non-zero angle relative to the axial axis, the second non-zero angle being substantially identical to the first non-zero angle.

In accordance with additional or alternative embodiments, the second annular plenum is radially inwardly offset relative to the first annular plenum.

In accordance with additional or alternative embodiments, the vortex inducing member comprises a guide ring arranged between the first annular plenum and the second annular plenum, the guide ring including a plurality of fuel guide slots that direct fuel from the fuel outlet along a pathway towards the pre-filming surface, the pathway including an axial component and a circumferential component.

In accordance with additional or alternative embodiments, a fuel injector having an injector outlet extends through the fuel outlet, the injector directing fuel toward the vortex inducing member along an axis that is substantially perpendicular to the axial axis.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
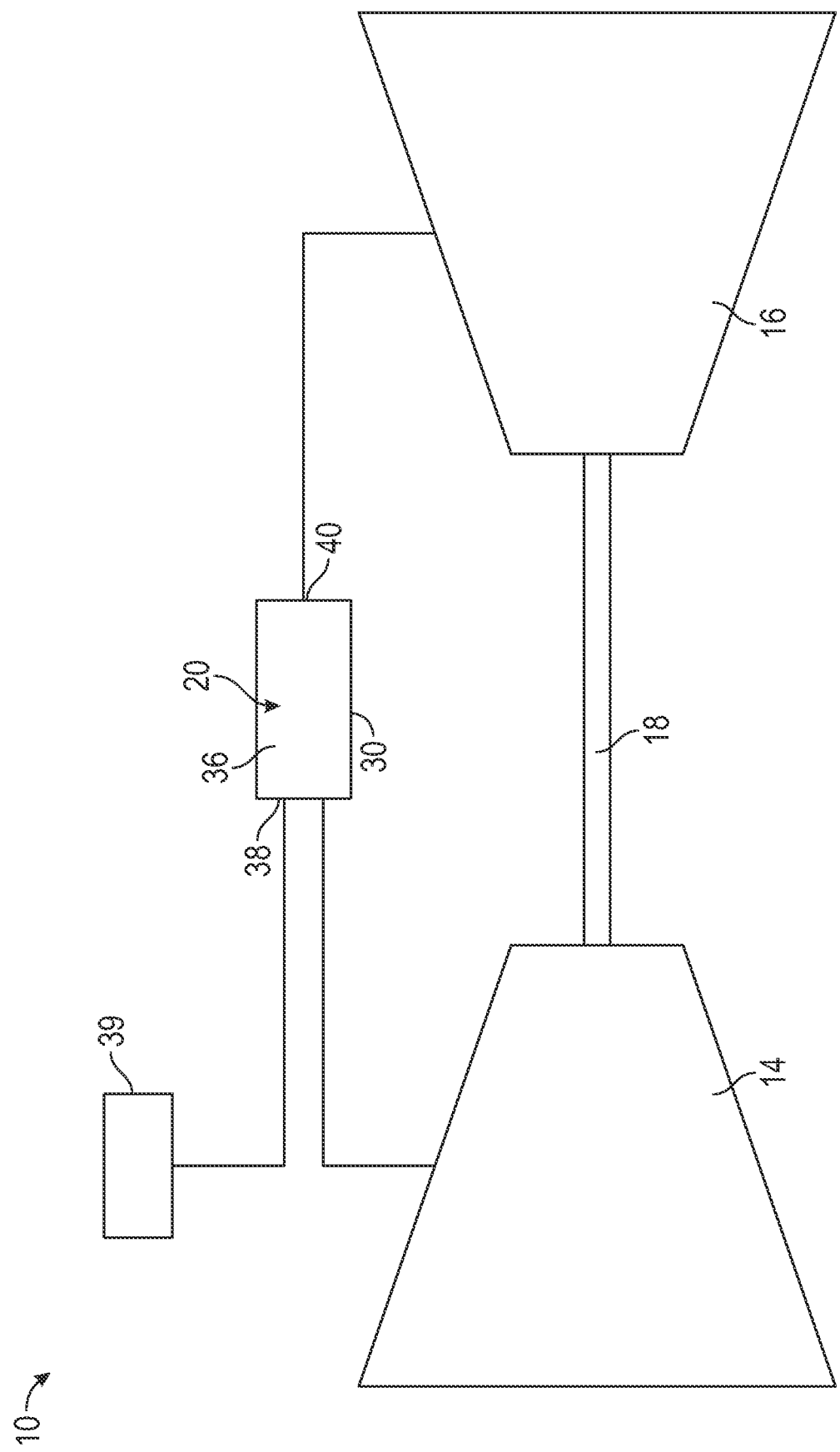
FIG. 1 is a schematic diagram of a turbomachine including a combustor assembly having a fuel injection system, in accordance with a non-limiting example.

A turbomachine, in accordance with a non-limiting example, is indicated generally at 10 in FIG. 1. Turbomachine 10 includes a compressor 14 mechanically connected to a turbine 16 through a shaft 18. Compressor 14 is also fluidically connected to turbine 16 through a combustor assembly 20. Combustor assembly 20 combines compressed air from compressor 14 with a fuel to form a combustible mixture. The combustible mixture is ignited in combustor assembly 20 and passed into turbine 16 as high pressure high temperature gases. The high temperature high pressure gases expand through turbine 16 creating power that may be used, for example, to provide thrust to an aircraft.

Figure 2:
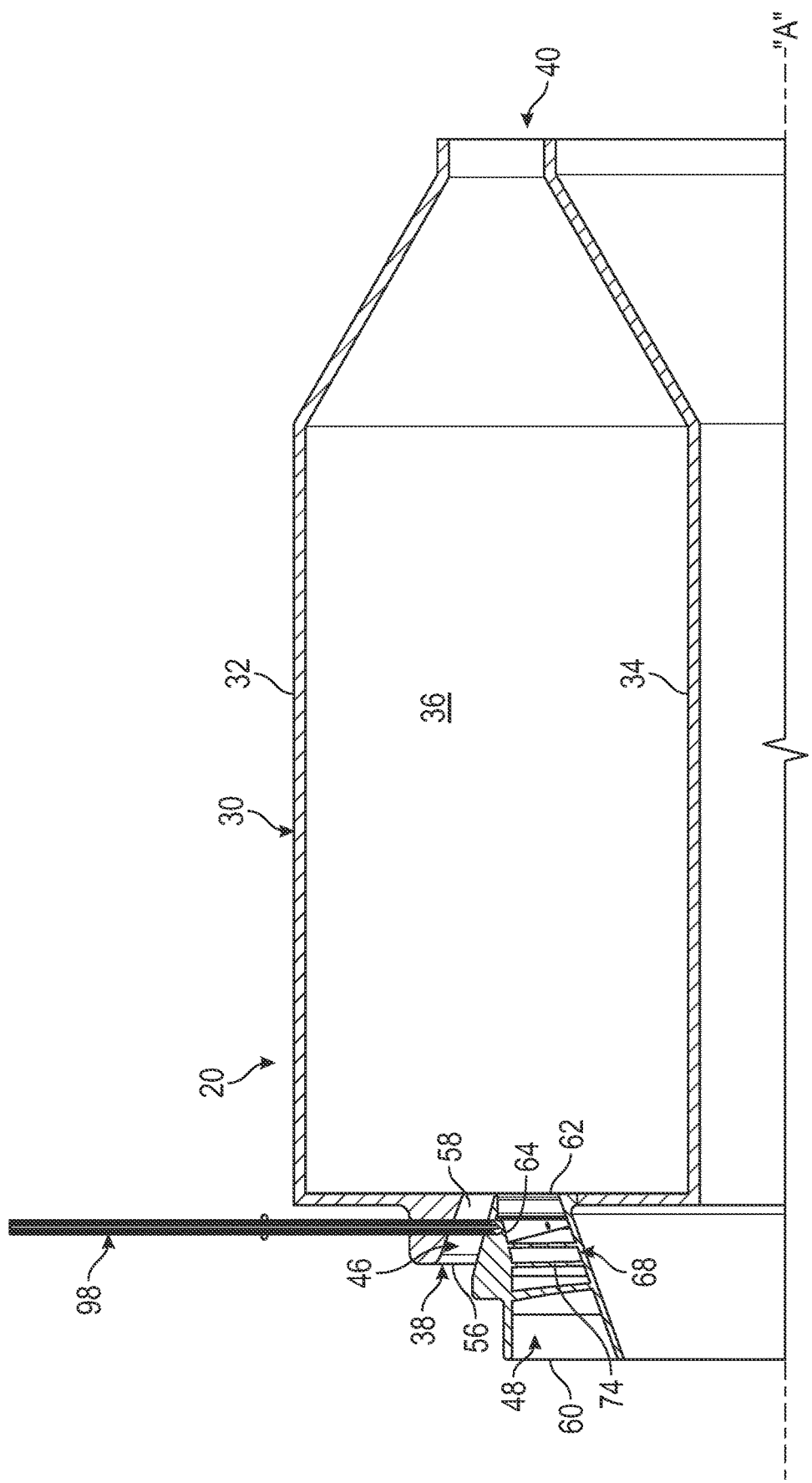
FIG. 2 is a cross-sectional view of the fuel injection system mounted in the combustor assembly, in accordance with a non-limiting example.

Referring to FIG. 2 and with continued reference to FIG. 1, combustor assembly 20 includes a combustor housing 30 having an outer surface 32 and an inner surface 34 that defines a combustion chamber 36. Combustion chamber 36 includes an inlet portion 38 connected to compressor 14 and a source of fuel 39 and an outlet portion 40. In a non-limiting example, inlet portion 38 is spaced from outlet portion 40 along an axial axis "A". Combustor assembly 20 includes a first annular plenum 46 and a second annular plenum 48. In a non-limiting example, first annular plenum 46 defines an outer air plenum (not separately labeled) and second annular plenum 48 defines an inner air plenum (also not separately labeled). As will be detailed more fully herein, first annular plenum 46 and second annular plenum 48 create and introduce an annular ring of fuel that is atomized and combusted in combustion chamber 36.

In a non-limiting example, first annular plenum 46 includes a first inlet 56 and a first outlet 58 that is spaced from first inlet 56 along axial axis "A". First outlet 58 is arranged at a first non-zero angle relative to axial axis "A". In a non-limiting example, the first non-zero angle forces first outlet 58 to direct an airflow radially inwardly and axially along combustion chamber 36. Second annular plenum 48 includes a second inlet 60 and a second outlet 62 spaced from second inlet 60 along axial axis "A". Second outlet 62 is arranged at a second non-zero angle relative to axial axis "A". As will be detailed more fully herein, the second non-zero angle forces an air fuel mixture radially outwardly and circumferentially into combustion chamber 36 to mix with and be atomized by air passing from first outlet 58. Second annular plenum 48 also includes a fuel outlet 64 that is disposed between second inlet 60 and second outlet 62 in accordance with a non-limiting example.

Figure 3:
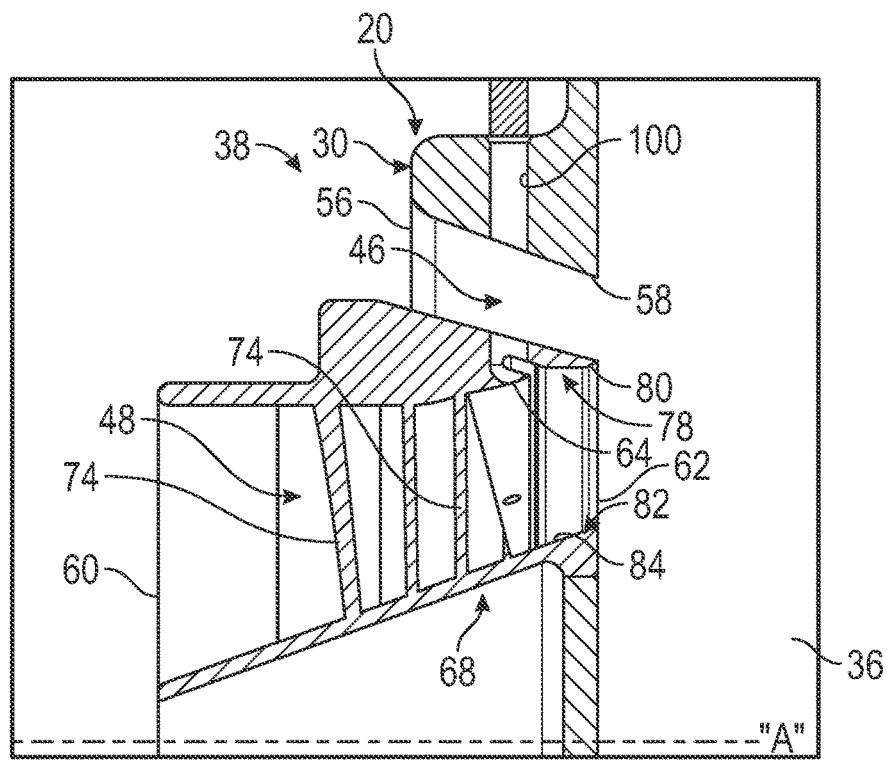
FIG. 3 is a partial cross-sectional view of the combustor assembly and fuel injection system without the fuel injector, in accordance with a non-limiting example.
Figure 4:
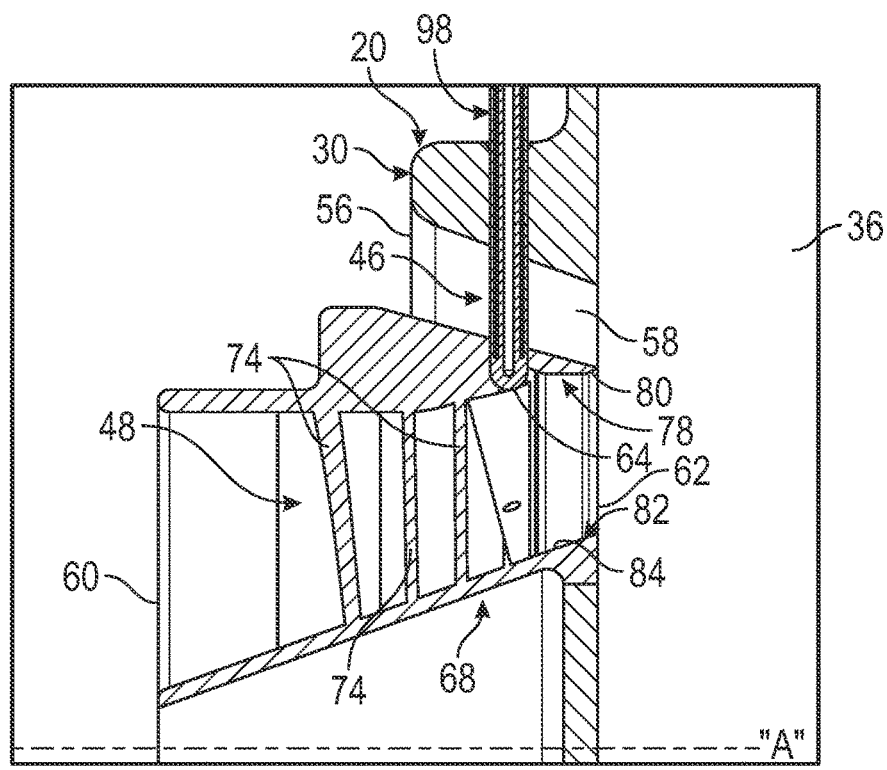
FIG. 4 is a partial cross-sectional view of the combustor assembly and fuel injection system of FIG. 3 with the fuel injector installed, in accordance with a non-limiting example.

As shown in FIGS. 3 and 4 and with continued reference to FIG. 2, a vortex inducing member 68 is arranged at inlet portion 38. Vortex inducing member 68 defines, in part, second annular plenum 48. Vortex inducing member 68 includes a plurality of guide vanes 74 arranged between second inlet 60 and second outlet 62. Guide vanes 74 may be spaced circumferentially about second annular plenum 48 and arranged to impart a swirling motion to air passing through second annular plenum 48. In a non-limiting example, second outlet 62 includes a first section 78 defining a pre-filming surface 80 and a second section 82 defining a guide surface 84. As discussed herein, first outlet 58 and second outlet 62 form converging airflows that meet in combustion chamber 36. At this point, it should be understood that the term "pre-filming surface" describes a surface onto which a fuel is spread into an annular liquid sheet prior to being introduced into a high velocity airstream.

As will be detailed more fully herein, pre-filming surface 80 receives an amount of fuel from fuel outlet 64. The amount of fuel is spread out onto pre-filming surface 80 forming a continuous annular liquid sheet or ring that is carried by air passing through second plenum 48 into air passing from first plenum 46 and immediately atomized forming an air fuel mixture that is then combusted to form the high pressure, high temperature gases having a substantially uniform temperature that are directed into and expanded through turbine 16.

Figure 5:
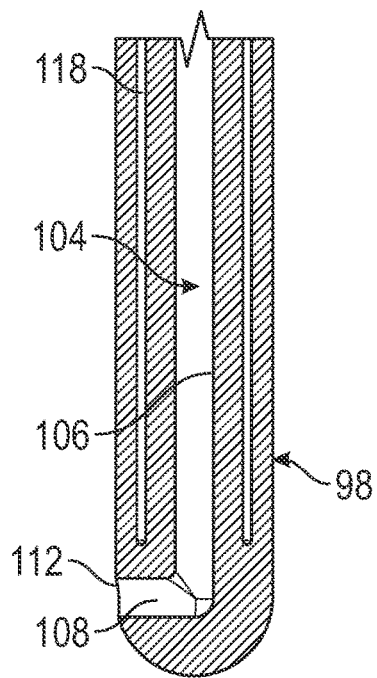
FIG. 5 is a cross-sectional view of an injection end of the fuel injector of FIG. 4, in accordance with a non-limiting example.

Referring to FIGS. 4 and 5 and with continued reference to FIGS. 2 and 3, combustor assembly 20 includes a fuel injector 98 arranged in a fuel injector passage 100 (FIG. 3) extending through combustor housing 30 and terminating at fuel outlet 64. As shown in FIG. 5, fuel injector 98 includes a fuel passage 104 having a first portion 106 that extends radially outwardly relative to axial axis "A" and a second portion 108 that is arranged at a non-zero angle relative to first portion 106. Second portion 108 includes an injector outlet 112. A continuous air gap 118 is arranged radially outwardly of, extends along, and encircles fuel passage 104. The number and arrangement of air gaps may vary. Air gaps 118 and 120 provide a thermal buffer between fuel flowing through fuel passage 110 and adjacent surfaces of combustor assembly 20.

Figure 6:
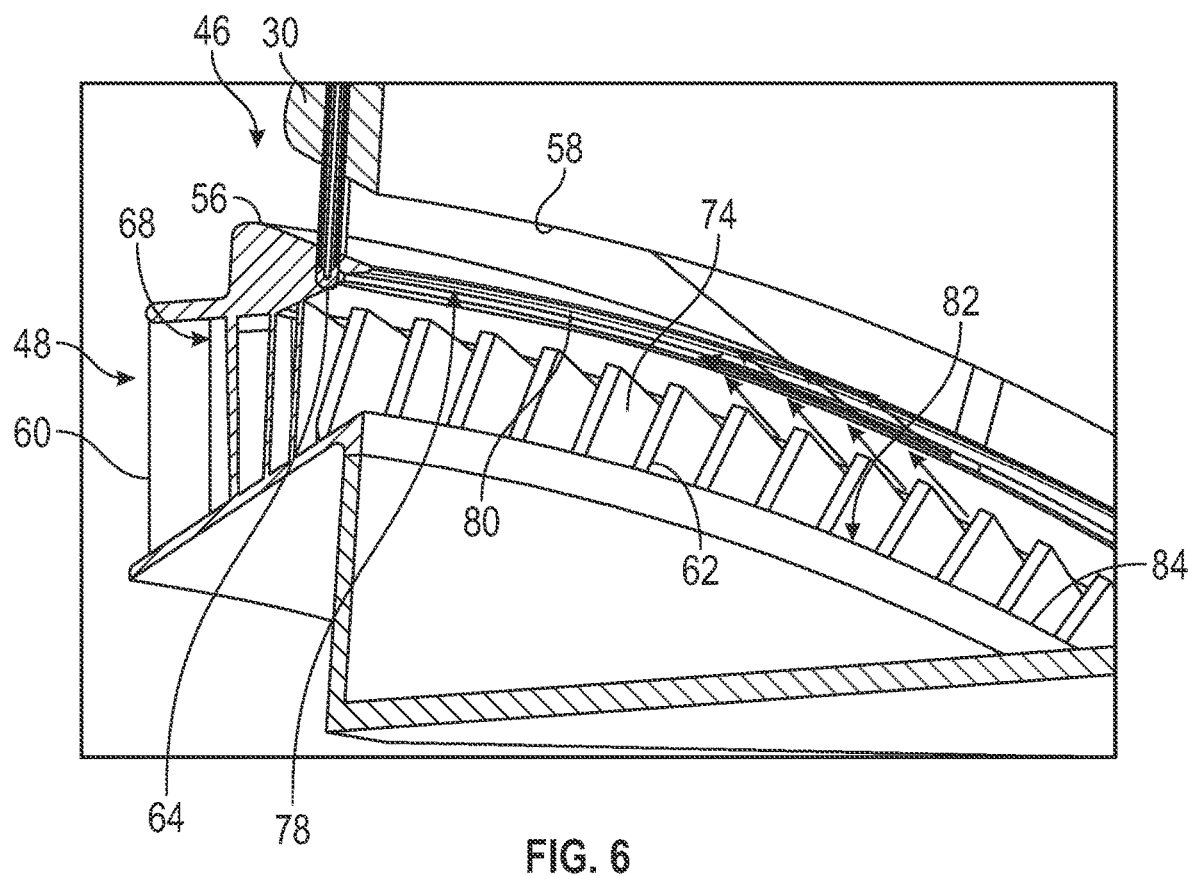
FIG. 6 is a partial perspective view of the combustor assembly and fuel injection system, in accordance with a non-limiting example.

Fuel flows from the source of fuel 39 into fuel injector 98. The fuel enters fuel passage 104 and is passed from injector outlet 112. The fuel exits fuel injector 98 and flows along a pathway towards second outlet 62. The fuel spreads out onto pre-filming surface 80 forming a continuous annular liquid sheet or ring that is carried by air passing through second plenum 48 into air passing from first plenum 46 as shown in FIG. 6 and is immediately atomized forming an air fuel mixture that is then combusted to form the high pressure, high temperature gases having a substantially uniform temperature that are directed into and expanded through turbine 16.

Figure 7:
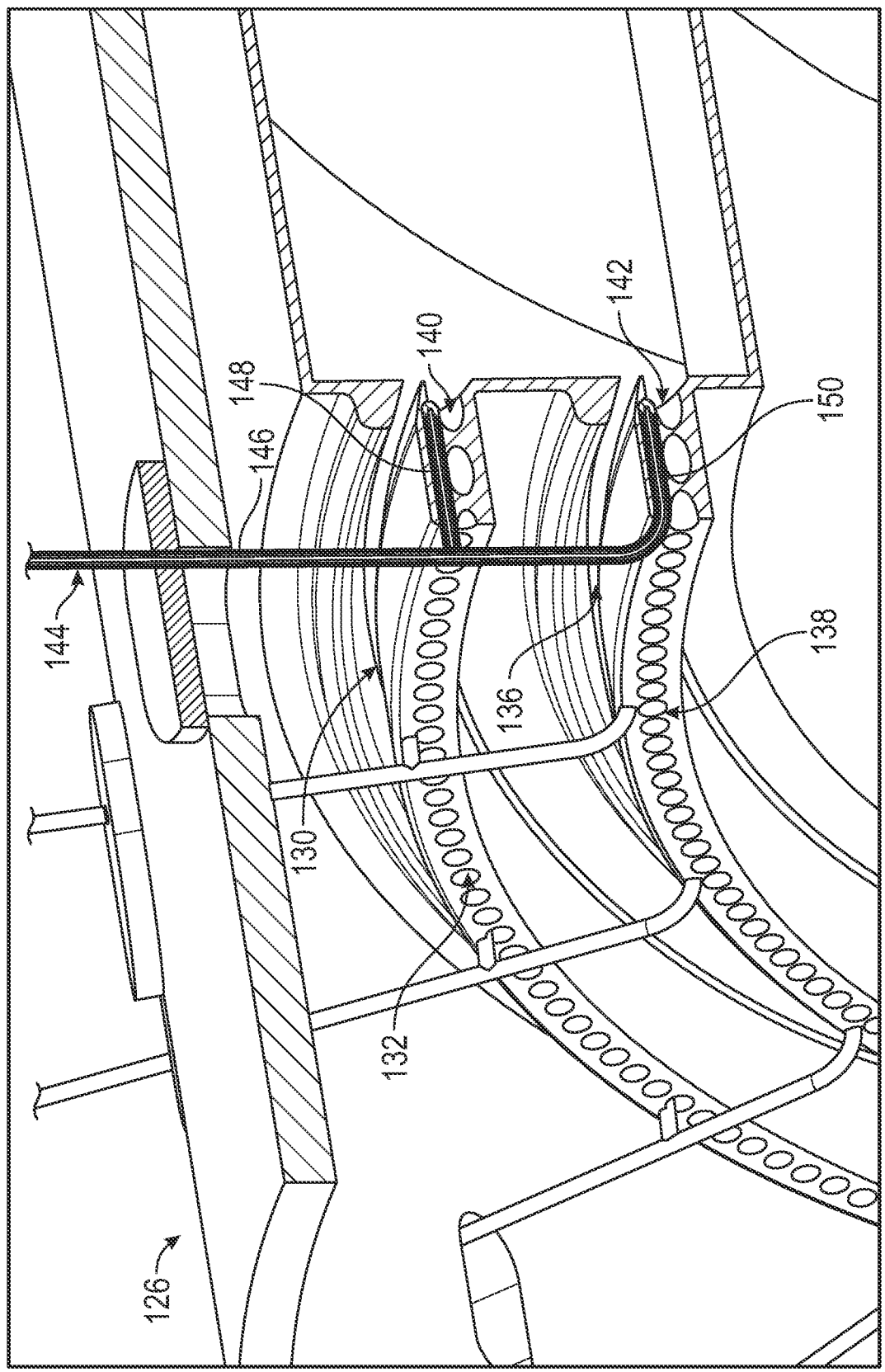
FIG. 7 is a partial cross-sectional view of a combustor assembly and fuel injection system, in accordance with another non-limiting example.

At this point it should be understood that while shown as having two annular plenums, the number of annular plenums arranged at inlet portion 38 of combustor housing 30 may vary as shown in FIG. 7. A combustor assembly 126 shown in FIG. 7 includes a first annular plenum 130, a second annular plenum 132 arranged radially inwardly of first annular plenum 130, a third annular plenum 136 arranged radially inwardly of second annular plenum 132, and a fourth annular plenum 138 arranged radially inwardly of third annular plenum 136. A first vortex inducing member 140 is arranged in second annular plenum 132 and a second vortex inducing member 142 is arranged in fourth annular plenum 138.

A fuel injector 144 having a first portion 146, a second portion 148, and a third portion 150 extends through combustor assembly 126. First portion 146 extends radially outwardly relative to combustor axis "A", second portion 148 and third portion 150 extend at a non-zero angle relative to first portion 146. Second portion 148 includes a first injector outlet (not shown) arranged at first vortex inducing member 140 and third portion 150 includes a second injector outlet (also not shown) arranged at second vortex inducing member 142. Injector 144 may be operated to introduce a first annular air/fuel mixture and/or a second annular air/fuel mixture into combustor assembly 126 to establish a more robust and flexible control of high temperature/high pressure gases being passed into turbine 16.

Figure 8:
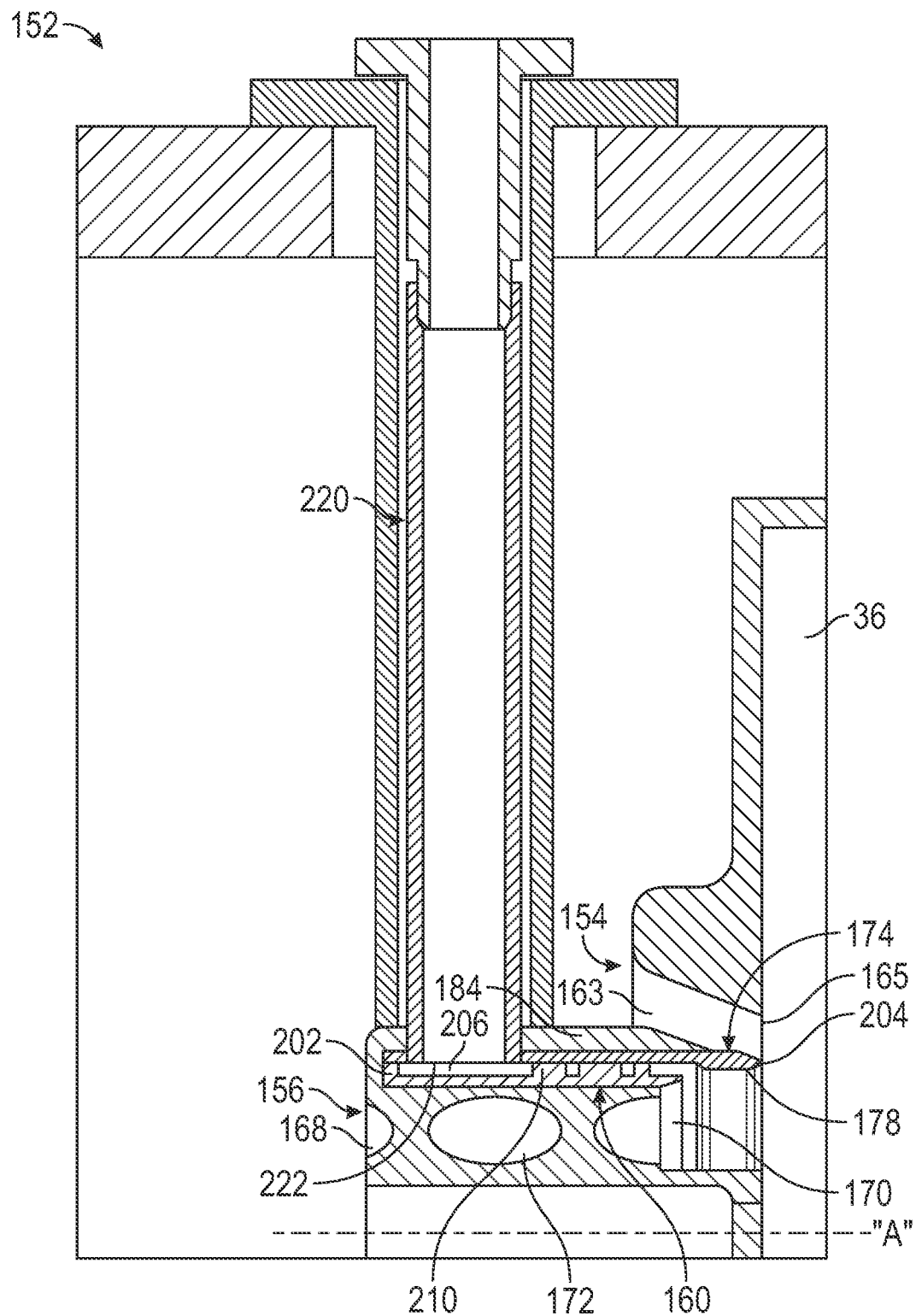
FIG. 8 is a partial cross-sectional view of a combustor assembly and fuel injection system, in accordance with yet another non-limiting example.

Instead of passing fuel through an angled injector outlet into a swirling air flow, a combustor assembly 152 as shown in FIG. 8 may be arranged to impart a swirl to the fuel prior to being introduced into the swirling airflow to promote atomization. Combustor assembly 152 includes a first annular plenum 154 and a second annular plenum 156. Second annular plenum 156 is arranged radially inwardly of first annular plenum 154 relative to combustor axis "A". A vortex inducing member 160 is arranged between first annular plenum 154 and second annular plenum 156.

First annular plenum 154 includes a first inlet 163 and a first outlet 165. First outlet extends at a first non-zero angle, having an axial component and a radial component, relative to combustor axis "A". Second annular plenum 156 includes a second inlet 168 and a second outlet 170. Second annular plenum 156 includes plurality of passages 172 extend at a second non-zero angle, having an axial component and a circumferential component, relative to axial axis "A".

Figure 9:
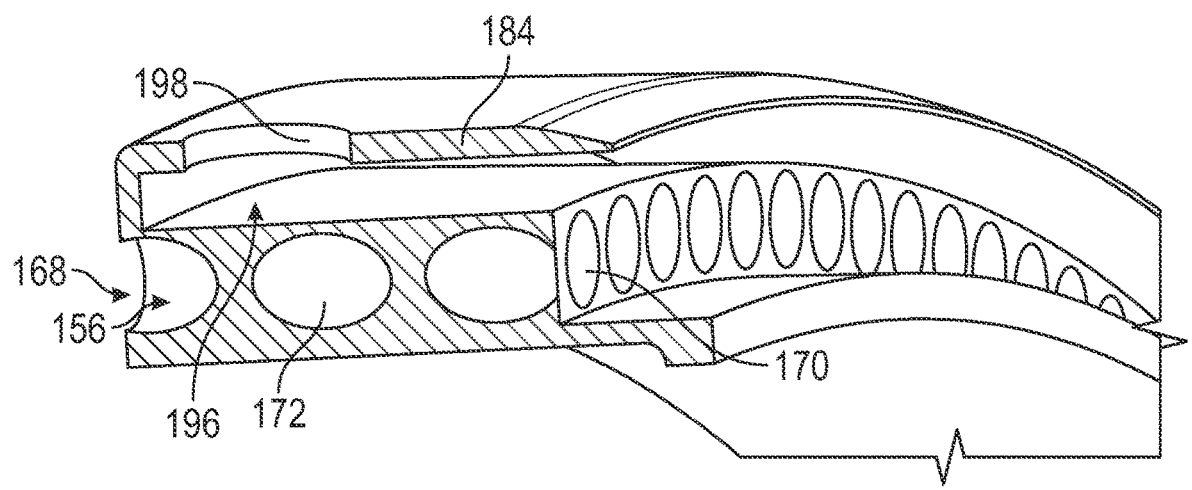
FIG. 9 is a partial cross-sectional view of a first portion of the fuel injection system of FIG. 8, in accordance with a non-limiting example.

Plurality of passages 172 are arranged between second inlet 168 and second outlet 170 as shown in FIG. 9. The first non-zero angle and the second non-zero angle impart a swirling motion to fluid passing through corresponding ones of first annular plenum 154 and second annular plenum 156. A pre-filming member 174 is arranged about second outlet 170. Pre-filming member 174 extends over vortex inducing member 160. Pre-filming member 174 includes a pre-filming surface 178 arranged axially outwardly of second outlet 170 along combustor axis "A". A heat shield 184 extends about pre-filming member 174 providing a thermal barrier to fuel passing into combustion chamber 36.

Figure 10:
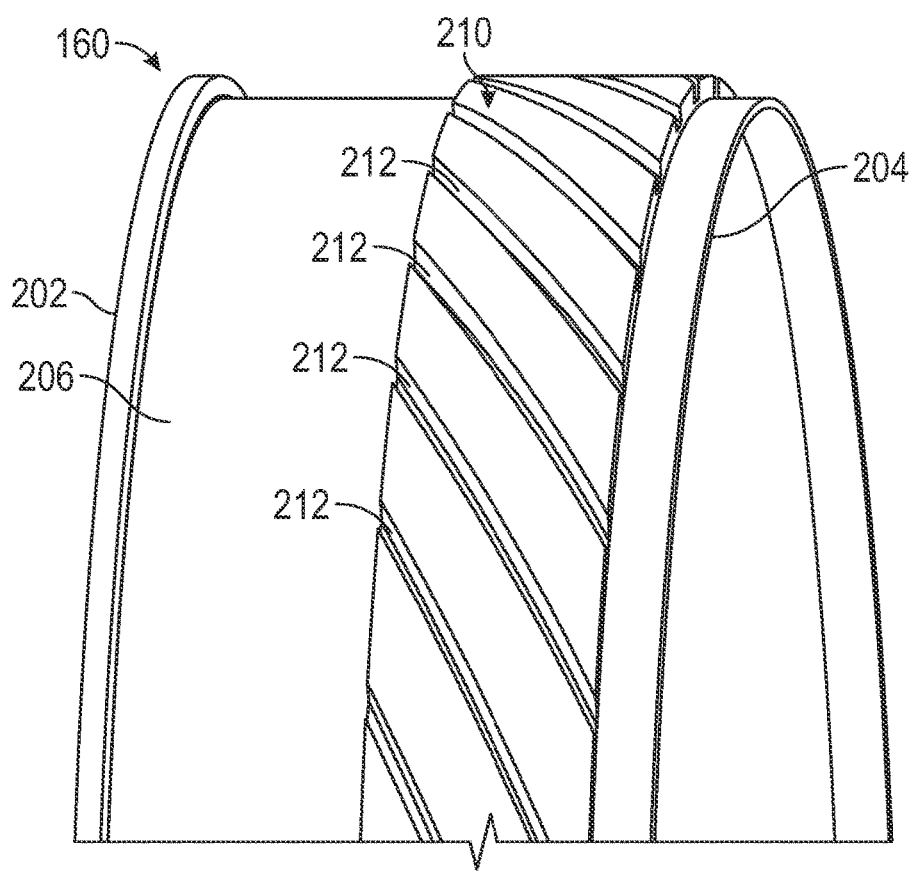
FIG. 10 is a partial perspective view of a second portion of the fuel injection system of FIG. 8, in accordance with a non-limiting example.

As shown in FIG. 9, a fuel passage 196 is arranged between first annular plenum 154 (FIG. 8) and second annular plenum 156 (FIG. 8). A fuel outlet 198 is provided in fuel passage 196. Vortex inducing member 160 is arranged in fuel passage 196. Vortex inducing member 160 is shown in the form of a guide ring, FIG. 10, (not separately labeled) including a first end section 202 arranged at fuel outlet 198 and a second end section 204 axially inwardly spaced from pre-filming surface 178. A fuel plenum 206 is formed in vortex inducing member 160 at first end section 202. Fuel plenum 206 is arranged radially inwardly of fuel outlet 198. Vortex inducing member 160 includes a vortex inducing portion 210 arranged between fuel plenum 206 and second end section 204. Vortex inducing portion 210 includes a plurality of fuel guide slots 212, as shown in FIG. 10, that extend at a non-zero angle relative to axial axis "A".

A fuel injector 220 is arranged in combustor assembly 152. Fuel injector 220 extends radially through combustor assembly 152 to an injector outlet 222 arranged at fuel plenum 206. Fuel flows from the source of fuel (not shown) into fuel injector 220. The fuel flows into fuel plenum 206 and is passed into the plurality of fuel guide slots 212 of vortex inducing portion 210. The fuel exits the plurality of fuel guide slots 212 at second end section 204 and passes to outlet member 174. The fuel spreads out onto pre-filming surface 178 forming a continuous annular liquid sheet or ring that is carried by air passing through second plenum 156 into air passing from first plenum 154 and is immediately atomized forming an air fuel mixture.

At this point, it should be appreciated that instead of introducing multiple discrete fuel injections into a combustion chamber, the non-limiting examples described herein create a continuous or substantially continuous annular ring of atomized fuel that is then combusted to form the high pressure, high temperature gases having a substantially uniform temperature that are directed into and expanded through turbine 16. The substantially uniform temperatures created by forming and combusting an annular atomized fuel/air mixture enhances turbine efficiency reduces localized component wear, and increases an overall operational life of the turbomachine.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A combustor assembly for a turbomachine comprising:
   a combustor housing defining a combustion chamber, the combustor housing including an inlet portion, an outlet portion, and an axial axis extending between the inlet portion and the outlet portion;
   a first annular plenum arranged at the inlet portion, the first annular plenum including a first inlet and a first outlet; and
   a second annular plenum, radially spaced from the first annular plenum, is arranged at the inlet portion, the second annular plenum including a second inlet, a second outlet, a vortex inducing member arranged between the second inlet and the second outlet, and a fuel outlet, the second outlet including a pre-filming surface that forms an annular ring of fuel that enters the second annular plenum through the fuel outlet of the second annular plenum and passes from the second annular plenum into a swirling fluid passing through the first outlet and the second outlet;
   wherein the vortex inducing member comprises a guide ring arranged between the first annular plenum and the second annular plenum, the guide ring including a plurality of fuel guide slots that direct fuel from the fuel outlet along a pathway towards the pre-filming surface, the pathway including an axial component and a circumferential component.

2. The combustor assembly according to claim 1, wherein the vortex inducing member includes a plurality of guide vanes extending between the second inlet and the second outlet.

3. The combustor assembly according to claim 2, wherein the plurality of guide vanes are arranged in an annular array.

4. The combustor assembly according to claim 3, wherein the fuel outlet is arranged between the plurality of guide vanes and the second outlet.

5. The combustor assembly according to claim 4, further comprising a fuel injector extending into the fuel outlet of the second annular plenum, the fuel injector including a first portion extending radially relative to the axial axis and a second portion extending from the first portion at a non-zero angle relative to axial axis.

6. The combustor assembly according to claim 5, wherein the fuel injector includes an injector outlet at the second portion, the injector outlet guiding an amount of fuel along a pathway towards the pre-filming surface, the pathway including an axial component and a circumferential component.

7. The combustor assembly according to claim 1, further comprising a fuel injector having an injector outlet extending through the injector outlet, the injector directing fuel toward the vortex inducing member along an axis that is substantially perpendicular to the axial axis.

8. A combustor assembly for a turbomachine comprising:
   a combustor housing defining a combustion chamber, the combustor housing including an inlet portion, an outlet portion, and an axial axis extending between the inlet portion and the outlet portion;
   a first annular plenum arranged at the inlet portion, the first annular plenum including a first inlet and a first outlet; and
   a second annular plenum, radially spaced from the first annular plenum, is arranged at the inlet portion, the second annular plenum including a second inlet, a second outlet, a vortex inducing member arranged between the second inlet and the second outlet, and a fuel outlet, the second outlet including a pre-filming surface that forms an annular ring of fuel that enters the second annular plenum through the fuel outlet of the second annular plenum and passes from the second annular plenum into a swirling fluid passing through the first outlet and the second outlet;
   wherein the vortex inducing member includes a plurality of guide vanes extending between the second inlet and the second outlet;
   wherein the plurality of guide vanes are arranged in an annular array;
   wherein the fuel outlet of the second plenum is arranged between the plurality of guide vanes and the second outlet;
   wherein the combustor assembly further includes: a fuel injector extending into the fuel outlet of the second annular plenum, the fuel injector including a first portion extending radially relative to the axial axis and a second portion extending from the first portion at a non-zero angle relative to the axial axis;
   wherein the plurality of guide vanes extend at a first non-zero angle relative to the axial axis and the second portion of the fuel injector extends at a second non-zero angle relative to the axial axis, the second non-zero angle being substantially identical to the first non-zero angle.

9. The combustor assembly according to claim 8, wherein the second annular plenum is radially inwardly offset relative to the first annular plenum.

10. A turbomachine comprising:
    a compressor;
    a turbine mechanically connected to the compressor; and
    a combustor assembly fluidically connected to the compressor and the turbine, the combustor assembly comprising:
      a combustor housing defining a combustion chamber, the combustor housing including an inlet portion, an outlet portion, and an axial axis extending between the inlet portion and the outlet portion;
      a first annular plenum arranged at the inlet portion, the first annular plenum including a first inlet and a first outlet; and
      a second annular plenum, radially spaced from the first annular plenum, is arranged at the inlet portion, the second annular plenum including a second inlet, a second outlet, a vortex inducing member arranged between the second inlet and the second outlet, and a fuel outlet, the second outlet including a pre-filming surface that forms an annular ring of fuel that enters the second annular plenum through the fuel outlet of the second annular plenum and passes from the second annular plenum into a swirling fluid passing through the first outlet and the second outlet;

wherein the vortex inducing member comprises a guide ring arranged between the first annular plenum and the second annular plenum, the guide ring including a plurality of fuel guide slots that direct fuel from the fuel outlet along a pathway towards the pre-filming surface, the pathway including an axial component and a circumferential component.

11. The turbomachine according to claim 10, wherein the vortex inducing member includes a plurality of guide vanes extending between the second inlet and the second outlet.

12. The turbomachine according to claim 11, wherein the plurality of guide vanes are arranged in an annular array.

13. The turbomachine according to claim 12, wherein the fuel outlet is arranged between the plurality of guide vanes and the second outlet.

14. The turbomachine according to claim 13, further comprising a fuel injector extending into the fuel outlet of the second annular plenum, the fuel injector including a first portion extending radially relative to the axial axis and a second portion extending from the first portion at a non-zero angle relative to axial axis.

15. The turbomachine according to claim 14, wherein the fuel injector includes an injector outlet at the second portion, the injector outlet guiding an amount of fuel along a pathway towards the pre-filming surface, the pathway including an axial component and a circumferential component.

16. The turbomachine according to claim 10, further comprising a fuel injector having an injector outlet extending through the fuel outlet, the fuel injector directing fuel toward the vortex inducing member along an axis that is substantially perpendicular to the axial axis.

17. A turbomachine comprising:
a compressor;
a turbine mechanically connected to the compressor; and
a combustor assembly fluidically connected to the compressor and the turbine, the combustor assembly comprising:

a combustor housing defining a combustion chamber, the combustor housing including an inlet portion, an outlet portion, and an axial axis extending between the inlet portion and the outlet portion;

a first annular plenum arranged at the inlet portion, the first annular plenum including a first inlet and a first outlet; and a second annular plenum, radially spaced from the first annular plenum, is arranged at the inlet portion, the second annular plenum including a second inlet, a second outlet, a vortex inducing member arranged between the second inlet and the second outlet, and a fuel outlet, the second outlet including a pre-filming surface that forms an annular ring of fuel that enters the second annular plenum through the fuel outlet and passes from the second annular plenum into a swirling fluid passing through the first outlet and the second outlet;

wherein the vortex inducing member includes a plurality of guide vanes extending between the second inlet and the second outlet;

wherein the plurality of guide vanes are arranged in an annular array, wherein the fuel outlet is arranged between the plurality of guide vanes and the second outlet;

wherein the turbomachine further includes a fuel injector extending into the fuel outlet of the second annular plenum, the fuel injector including a first portion extending radially relative to the axial axis and a second portion extending from the first portion at a non-zero angle relative to the axial axis; and wherein the plurality of guide vanes extend at a first non-zero angle relative to the axial axis and the second portion of the fuel injector extends at a second non-zero angle relative to the axial axis, the second non-zero angle being substantially identical to the first non-zero angle.

18. The turbomachine according to claim 17, wherein the second annular plenum is radially inwardly offset relative to the first annular plenum.

* * * * *